Nov. 28, 1961     G. WILKE ET AL     3,011,003
PROCESS FOR THE PREPARATION OF TRIVINYL CYCLOHEXANES
Filed Nov. 12, 1958
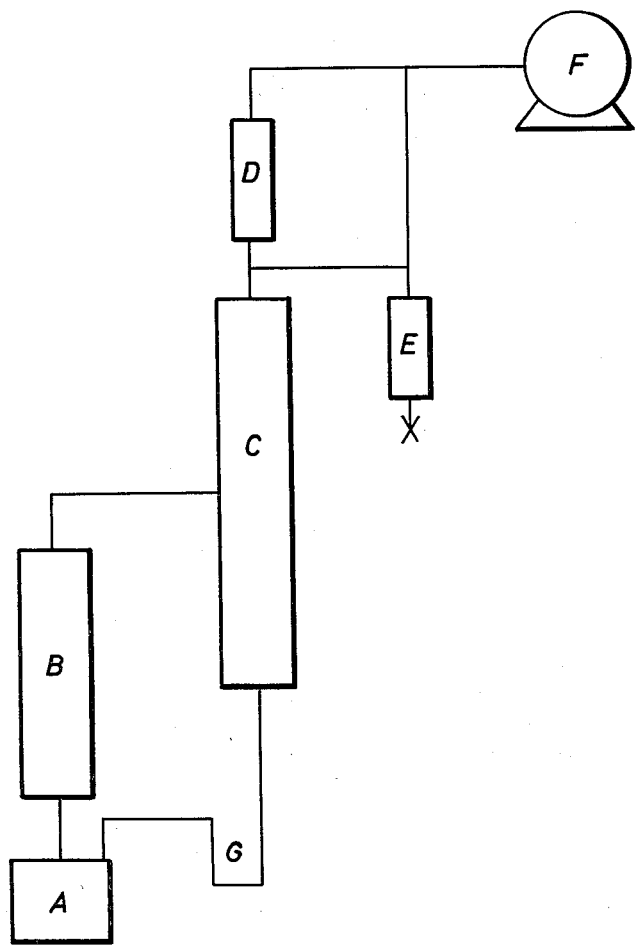
INVENTORS
GUNTHER WILKE + ROLAND RIENÄCKER
BY
Burger, Dinklage + Sprung
ATTORNEYS

United States Patent Office 3,011,003
Patented Nov. 28, 1961

---

3,011,003
PROCESS FOR THE PREPARATION OF TRIVINYL CYCLOHEXANES
Gunther Wilke, Mulheim (Ruhr), and Roland Rienäcker, Essen (Ruhr), Germany, assignors to Studiengesellschaft Kohle m.b.H., Mulheim (Ruhr), Germany, a corporation of Germany
Filed Nov. 12, 1958, Ser. No. 773,345
Claims priority, application Germany Nov. 16, 1957
9 Claims. (Cl. 260—666)

The present invention is concerned with a process for the preparation of trivinyl cyclohexanes.

Belgian patent specifications Nos. 555,180 and 564,175, propose processes for the production of cyclododeca-tri-(1,5,9)-enes. Diolefines, for example butadiene, are used as the starting materials for the production of cyclododecatrienes. The new cyclododecatri-(1,5,9)-enes contain three double bonds in the molecule and consequently may be used for a very wide range of reactions by which new and valuable products can be obtained.

Belgian patent specification No. 567,112 describes the production of cyclic carboxylic acids and/or their esters from cyclododecatrienes and points out that when catalysts of the boron fluoride dihydrate type are used, isomerization of the cyclododecatrienes takes place, to form an isomer in which double bonds cannot be detected.

It has now been found that the cyclododecatrienes can be isomerized by purely thermal methods. According to our invention, cyclododecatrienes are heated to temperatures between 300 and 650° C. and the reaction product of lower boiling point is thereafter separated out from the starting material by distillation. In the reaction, the cyclododecatri-(1,5,9)-ene is rearranged to form a hitherto unknown isomer, a trivinyl cyclohexane, in accordance with the equation:

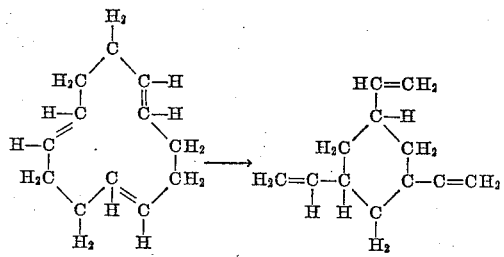

As shown by the above formulae, the 12-membered ring containing three double bonds undergoes ring contraction to form a 6-membered ring which is substituted by three vinyl groups. The reaction product consists of a liquid with a substantially constant boiling point, B.P.$_{20}$=86–90° C., $n_D^{20}$=1.4780–1.4820, the molecular weight and composition of this liquid corresponding to $C_{12}H_{18}$, that is to say it conforms to a cyclododecatriene isomer.

The process according to the invention can be carried out continuously or intermittently. The best results are obtained at pressures between atmospheric pressure and reduced pressure, and more especially at partial pressures between 1 and 760 mm. Hg. Such reduced partial pressures are obtained (i) by admixing inert gases, such as nitrogen, or by admixing steam, (ii) by reducing the actual pressure to a certain degree.

Particularly suitable reaction temperatures are between 450 and 550° C., since at lower temperatures the isomerization proceeds considerably more slowly and at higher temperatures a partial cleavage to lower hydrocarbons, and more especially to butadiene, takes place.

The different isomers of cyclododecatriene, for example the trans-trans-cis form or the trans-trans-trans form, may be used for the isomerization reaction described above. Only the bands which are characteristic of vinyl groups appear in the infra-red spectrum of the products obtained by the transposition or rearrangement, and appear in the intensity required for three double bonds per $C_{12}H_{18}$, instead of the bands of middle-position trans- and cis-double bonds of the starting material. Three double bonds are, furthermore, involved on catalytic hydrogenation, and accordingly the constitution of a trivinyl cyclohexane is confirmed. Probably a mixture of compounds of cis-trans-isomeric nature as regards the ring plane are present in the reaction product. It has not so far been possible to prove that only 1,3,5-trivinyl cyclohexanes are present, or whether a mixture of 1,3,5- and 1,2,4-trivinyl cyclohexanes is formed.

There was no reason at all to expect that the isomerization of the cyclododecatrienes as described above would take place. Furthermore, the high yield which this isomerization provides is particularly surprising. Trivinyl cyclohexane is obtained in substantially quantitative yields according to the invention. In the normal case, olefines are split into small fragments at the temperatures to be used according to the invention, for example as in the cracking of vinyl cyclohexane to butadiene.

Because of the three vinyl groups in the molecule, trivinyl cyclohexanes constitute excellent new starting materials for organic syntheses, for example the preparation of corresponding trialcohols or trioxyethyl cyclohexanes, which themselves serve as valuable raw materials for the manufacture of plastics, such for example as polyesters.

The following examples further illustrate the invention:

Example 1

A simple apparatus for use in effecting isomerization consists of an evaporator flask of about 500 cc. capacity, to which is connected a tube of Jena glass or quartz extending downwardly at an inclination. For better heat transfer, this tube is preferably filled with metal filler bodies, for example coils of V$_2$A wire, and can be heated to 400–500° C. This reaction tube terminates in a cooled receiver. In the evaporator flask, 300 cc. of trans-trans-cis cyclododecatriene are preheated to 180–210° C., while the temperature in the reaction tube is adjusted to about 500° C. By means of a stream of inert gas, for example nitrogen, passed through the hot cyclododecatriene, the latter is conducted through the reaction furnace with a partial pressure which corresponds to its vapour pressure at 180–210° C. In the receiver, the reaction products are condensed and the nitrogen is either blown off or circulated by means of a pump. If the major part of the cyclododecatriene supplied is vaporized in this way and if the reaction products are condensed in the receiver, the condensate is worked up by distillation. After a small quantity of first runnings, the isomerization product distils over at B.P.$_{20}$=86–90° C., $n_D^{20}$=1.4780–1.4820. Unreacted cyclododecatriene is obtained as the next fraction, and a small residue is also left. The degree of conversion and the yield depend very largely on the residence time and on the speed of the gas stream.

Example 2

Instead of the evaporator flask, a dropping funnel can be connected to the head end of the inclined reaction tube. Cyclododecatriene is, in this case, slowly introduced dropwise, and vaporized immediately at the beginning of the heating zone. When using this arrangement, the operation is carried out without an inert gas stream. The yields are, however, somewhat lower.

Example 3

A vertically disposed quartz tube is enclosed by an electric heating coil by which the tube can be heated to experimental temperatures and is provided in the lower part (10 cm. of a total tube length of 30 cm.) with a material of high thermal capacity which can be heated up by an induction coil, for example small gold rods. The zone which can be heated by induction serves for the vaporization and heating of the cyclododecatriene to an isomerization temperature. Connected below this heating tube by means of a T-junction are two small electric preheating furnaces, by means of which both the hydrocarbon and the water to be added for the isomerization reaction can be preheated to near their boiling points. By means of two small liquid pumps, the hydrocarbon and, if desired, water can be injected through the preheating furnaces from below into the reaction tube in a predetermined ratio and at a constant speed. At the top of the reaction tube, it is possible to chill the vapours with water or even to condense them in a reflux condenser. A movable thermoelement enables the temperature to be measured throughout the length of the quartz tube. The free space of the reaction tube as described is 45 cc.

The following experimental data were obtained in experiments with and without admixture of steam:

| Temperature, °C. | Injection, cc./hour | | Composition of the condensate, apart from water, in percent | | | Residue | Yield in percent of trivinyl cyclohexane |
|---|---|---|---|---|---|---|---|
| | $C_{12}$ Compound | $H_2O$ | First runnings | Isomer | Cyclododecatri-(1,5,9)-ene | | |
| 600 | 75 | 15 | 18 | 45 | 17 | 20 | 54 |
| 540 | 75 | 15 | 14 | 49 | 28 | 9 | 68 |
| 500 | 75 | 15 | 4 | 38 | 53 | 5 | 81 |
| 450 | 75 | | 1 | 22 | 76 | 1 | 92 |

The yields of the first two experiments at 600 and 540° C. are lowered by 2–3% if the gas volume formed during the isomerization are taken into account. At 450–500° C., practically no gas is evolved.

*Example 4*

Connected vertically above a 500 cc. evaporator flask A (see the single figure of the accompanying drawings) is a reaction tube B made of Jena glass or quartz with an internal diameter of 25 mm. and a length of 300 mm., arrangements being made for the heating of the tube by an electric furnace. For the purpose of better heat transfer, the tube is filled with coils of $V_2A$ wire with a diameter and length of 3–4 mm.

The temperature is measured by means of a thermoelement incorporated at the upper end. Connected to the head of the reaction tube is a continuous column C, on which is mounted a column head D with condenser and receiver. The column is provided at the bottom end with an overflow G through which the product flowing back is conveyed into the evaporator. The reaction product removed through the head is collected in the receiver E. The desired vacuum is adjusted by means of the pump F.

The evaporator A is charged with 300 cc. of trans-trans-cis cyclododecatri-(1,5,9)-ene and this is heated to boiling point at a vacuum of 20 mm. Hg. At the head of the column, a boiling temperature of 110° C. is adjusted, and the temperature of the column is always kept 10° C. below the boiling temperature by means of an electric heating system. The column head is first of all adjusted for total reflux, that is to say so that all the distillate flows through the overflow back into the evaporator. When a constant circulation is obtained in this way, the reaction tube is heated to 490–510° C. After a short time, the boiling temperature at the head of the column falls and finally remains at 88–90° C. When this temperature is reached, the isomer which is formed is removed with a reflux ratio of 1:20, in such a way that a state of equilibrium between formation and withdrawal is achieved.

The results which were obtained at different temperatures are reproduced in the following table:

| mm. Hg | Temperature in reaction tube, °C. | Isomer, cc./hour |
|---|---|---|
| 20–21 | 490–500 | 8–9 |
| 41–42 | 500–510 | 18–20 |
| 77–78 | 500–510 | 28–30 |

In the manner described, 1000 cc. of cyclododecatri-(1,5,9)-ene were subjected to isomerisation and, of this quantity, 950 cc. were removed as isomer through the head. 50 cc. remained as residue in the evaporator flask, and 25 cc. thereof could still be recovered in the form of cyclododecatri-(1,5,9)-ene. The product removed through the head was again distilled in a column, 35 cc. thereof passing over as first runnings boiling at a low temperature. 800 cc. of trivinyl cyclohexane were withdrawn at 86–90° C. and 20 mm. Hg, $n_D^{20}$=1.4780–1.4820. 115 cc. of cyclododecatri-(1,5,9)-ene were recovered as last-runnings. The yield is thus 93% of trivinyl cyclohexane with a conversion of about 85%.

*Example 5*

In the apparatus described in Example 4, trans-trans-trans-cyclododecatri-(1,5,9)-ene was isomerized at a pressure of 77–78 mm. Hg and a temperature of 500–515° C. Under these conditions, 20–22 cc. of isomer could be withdrawn per hour through the head, that is to say the isomerization proceeds somewhat more slowly than with the trans-trans-cis-cyclododecatri-(1,5,9)-ene. Yield 90–95%.

What we claim is:

1. Process for the production of trivinyl cyclohexanes, wherein a cyclododecatri-(1,5,9)-ene is heated at temperatures between 300 and 650° C. and the reaction product of lower boiling point is thereafter separated from the starting material by distillation.

2. Process according to claim 1, wherein temperatures between 450 and 550° C. are used.

3. Process according to claim 1, wherein atmospheric pressure is used.

4. Process according to claim 1, wherein reduced pressure is used.

5. Process according to claim 4, wherein partial pressures between 1 and 760 mm. Hg are used.

6. Process according to claim 5, wherein the partial pressure of the cyclododecatri-(1,5,9)-ene is achieved by admixture of an inert gas.

7. Process according to claim 5, wherein the partial pressure of the cyclododecatri-(1,5,9)-ene is achieved by admixing steam.

8. Process according to claim 5, wherein the partial pressure of the cyclododecatri-(1,5,9)-ene is achieved by applying a predetermined vacuum.

9. Trivinyl cyclohexane, B.P. 20 mm. Hg=86–90° C., $n_D^{20}$=1.4780–1.4820.

References Cited in the file of this patent
UNITED STATES PATENTS

| 2,543,092 | Bondhus | Feb. 27, 1951 |
| 2,584,969 | Chapman | Feb. 12, 1952 |
| 2,686,208 | Reed | Aug. 10, 1954 |
| 2,686,209 | Reed | Aug. 10, 1954 |
| 2,839,510 | Benson | June 17, 1958 |

OTHER REFERENCES

Berichte, vol. 62 (1929), page 263.
Levina et al.: Chemical Abstracts, vol. 49 (1955), page 3847.